United States Patent [19]
Trammell, Jr.

[11] 3,779,099
[45] Dec. 18, 1973

[54] BICYCLE DRIVE ASSEMBLY
[75] Inventor: Earl M. Trammell, Jr., Ladue, Mo.
[73] Assignee: Cycle-Drive Corporation, St. Louis, Mo.
[22] Filed: Feb. 28, 1972
[21] Appl. No.: 229,898

[52] U.S. Cl.............. 74/594.3, 280/256, 280/257
[51] Int. Cl............................................ B62m 3/04
[58] Field of Search.................. 74/594.3; 280/257, 280/256, 253

[56] References Cited
UNITED STATES PATENTS

| 465,140 | 12/1891 | McCammon | 280/257 |
|---|---|---|---|
| 457,290 | 8/1891 | Phillips | 280/257 |
| 2,424,639 | 7/1947 | Sobirai | 280/257 |
| 3,132,877 | 5/1964 | Pontin | 280/257 |
| 2,391,809 | 12/1945 | Wasem | 280/253 |

*Primary Examiner*—Charles J. Myhre
*Assistant Examiner*—F. D. Shoemaker
*Attorney*—Cohn et al.

[57] ABSTRACT

A drive assembly for a physically propelled vehicle such as a bicycle having a crank arm operatively connected to a drive member rotatively mounted on a drive axis for rotating the drive member, and a one-way clutch connecting an advance-crank arm to the crank arm for pivotal movement of the advance-crank arm relative to the crank arm in only one direction. A pedal arm is operatively connected to the connector for substantially moving a portion of a connector with an alternating motion of less than 360° in a predetermined path. A resilient spring interconnects the connector and the advance-crank arm. The connector transmits the turning force to a pivot between the connector and advance-crank arm upon application of sufficient pedal force to overcome a predetermined loading of the resilient spring, the turning force being automatically transferred from the crank arm pin to the pivot of the advance-crank arm, and being automatically transferred back to the crank arm pin upon further rotation of the crank arm and advance-crank arm as the loading of the resilient spring balances and overcomes the pedal force. When the predetermined loading of the resilient spring is overcome, a change in the angle between the connector and advance-crank arm is achieved.

17 Claims, 10 Drawing Figures

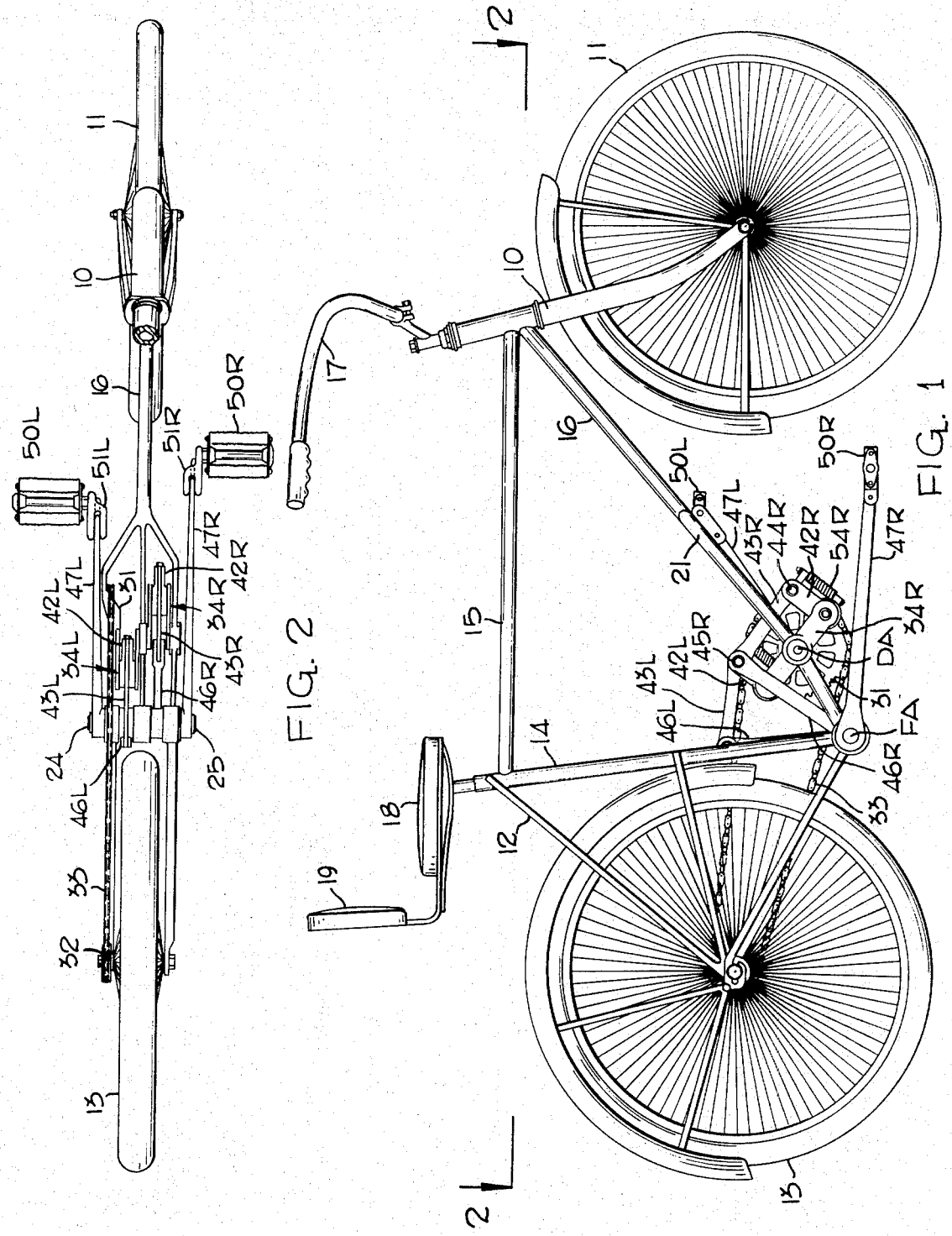

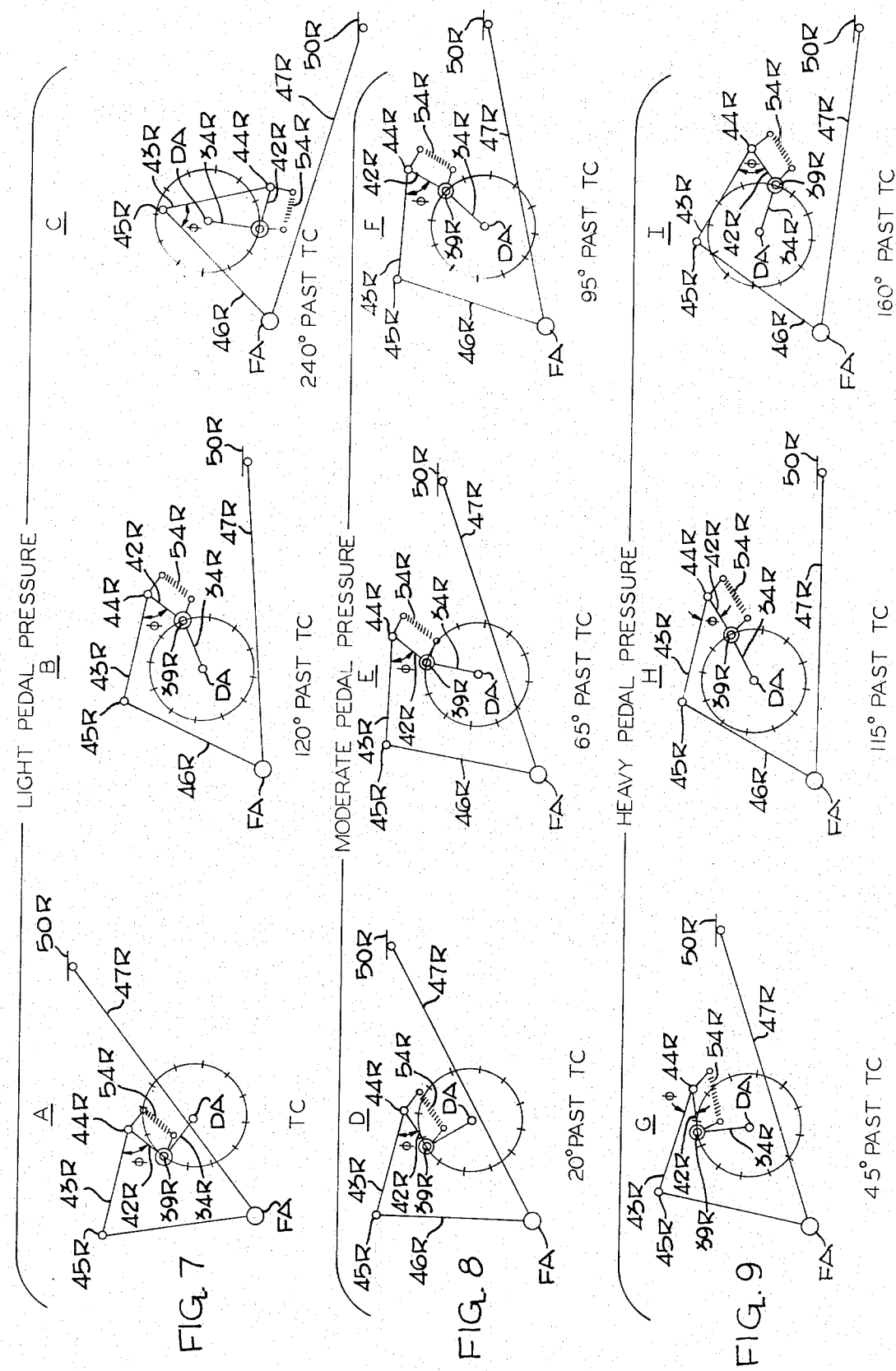

BICYCLE DRIVE ASSEMBLY

BACKGROUND OF THE INVENTION

This invention relates generally to improvements in a drive assembly for a physically propelled vehicle, and more particularly to an improved bicycle drive assembly.

A heretofore conventional bicycle drive assembly includes a crank shaft having a pedal which is connected to a sprocket, the pedal and crank shaft are turned directly with a rotary motion imparted by the rider. This rotary action requires certain leg movements and a resultant transfer of physical power that is not efficient.

There have been various types of drives developed for propelling a bicycle with substantially reciprocating pedal action, but these prior drive assemblies have met with no success because they too are inefficient in their transfer of driving power through well known ratchet-pawl and linkage mechanisms.

SUMMARY OF THE INVENTION

This invention incorporates a pedal action in combination with a new crank structure that permits a more efficient application of pedal pressure over 360° of crank travel than does the heretofore conventional rotary pedal action bicycle or the heretofore designed drive mechanisms utilizing a reciprocating or oscillating pedal action.

This new drive assembly eliminates a top dead center position from occurring at the top of the pedal stroke by permitting a turning force to be applied when the crank arm is at top center position. The drive mechanism is designed so that at the moment of top center position, by applying added pressure to the top pedal, the effective crank arm position advances automatically from zero degrees to an established number of degrees, thereby permitting a positive turning force to be applied when the crank arm is at top center or even a few degrees before top center. A pedal arm is always in position to receive a straight forward push from the rider's leg. The rider can apply effective pedal pressure from approximately 0° to 180° of each pedal power stroke. This lever action further makes for the effective use of a high back seat which helps to compound the rider's leg push.

As will be seen the resilient means on this present drive assembly can be adjusted in degree from a weak tension loading to a strong tension loading. With a very weak tension loading, pedal pressure, at top center, would immediately be transferred to the advance-crank arm pivot means and so remain until pedal pressure was normally released at or near the bottom of the stroke. With such a weak tension load setting, the angle closure between the advance-crank arm and connector is limited by a stop or bumper on the connector which abuts the crank arm pivot head.

When the tension loading is sufficiently increased, this present drive assembly provides an accelerator thrust action that assists in attaining higher speeds for bicycles. This accelerator thrust action is automatically obtained at moderate to fast speeds, and occurs during the down pedal stroke and varies in proportion to the pedal pressure and rate of stroke. At the moment of crank travel, when sufficient maximum pedal pressure has been transferred to an advance-crank arm position, a resilient means providing a tension loading starts to extend. When the resilient means ceases to expand, all pedal pressure is automatically reversed from the advance-crank arm position back to the conventional crank arm position. During the early degrees of crank travel, accelerator thrust action will cause the pedal travel to accelerate in relation to conventional pedal travel, and then during the middle or latter degrees of down crank travel, it will cause the pedal to slow down in relation to conventional pedal travel.

As will be understood, when pedaling a bicycle at slow speeds, the rider's leg push is slower and more extended over the down pedal travel than at fast speeds. As the speed of the bicycle increases, the greater and quicker the leg push and the less extended actual push there is on the down stroke, until at maximum speeds, the leg push amounts to a strong pulsating action on the pedal during the early part of the down stroke and with little push affected over the latter part of such stroke. At fast speeds, it will be noted that the tensional loading built up into the resilient means during the early part of the down pedal stroke, will, automatically yield a thrust action during the latter part of the down pedal stroke. For this reason, it is believed that the improved drive assembly will provide for the attainment of faster speeds for the bicycle rider.

Moreover, a pedal pressure with the present drive assembly can be more effectively extended over the later degrees of the down stroke than on a conventional rotary type crank drive, because of the designed radius of lever action which permits the connector to remain at a favorable torque angle to the crank arm during the later stages of the pedal stroke.

The drive assembly includes a crank arm operatively connected to a drive member rotatively mounted on a drive axis for rotating the drive member, and a one-way clutch connecting an advance-crank arm to the crank arm pin of the crank arm for pivotal movement of the advance-crank arm relative to the crank arm in only one direction. A pivot means secures a connector to the advance-crank arm. Pedal means is operatively connected to the connector for substantially moving a portion of the connector with an alternating motion of less than 360° in a predetermined path. A resilient means interconnects the connector and the advance-crank arm. The connector transmits the pedal force to the pivot means upon application of sufficient pedal force to overcome the loading of the resilient means, the turning force being transferred from the crank arm pin and being advanced automatically to the pivot means to provide an advanced, effective crank arm.

The loading of the resilient means tends to maintain a predetermined angle between the connector and the advance-crank arm. When the predetermined loading of the resilient means is overcome by the application of sufficient pedal force, the angle between the connector and the advance-crank arm can change and permit the automatic transference of the turning force from the crank arm pin to the pivot means.

The pedal means includes a lever pivotally mounted on a fixed axis and pivotally mounted to the connector portion, an the pedal means includes a pedal arm pivotally mounted on the same fixed axis as the lever for substantially alternating motion of less than 360° and attached to the lever to move the lever upon movement of the pedal arm, and a pedal carried by the pedal arm for actuating the pedal arm.

The predetermined path to which the connection portion is constrained, is offset in the direction of drive member rotation from a line drawn between the drive axis and the crank arm pin when the crank arm pin is located in its top center position. This arrangement enables more effective transference of power by the connector to the crank arm at the later portion of the downstroke, while the possible transference of the turning force automatically from the crank arm pin to the advanced pivot means provides for effective utilization of power during the early portion of the downstroke.

The pivot means is disposed forwardly in the direction of drive member rotation relative to the crank arm pin and associated one-way clutch when the crank arm pin is located substantially at its top center position, whereby the effective crank arm position is automatically advanced from the crank arm pin to the pivot means when the loading of the resilient means is overcome by the application of sufficient pedal force.

The resilient means provides a predetermined loading that tends to maintain the angle between the connector and the advance-crank arm until sufficient pedal force is applied through the connector to overcome such predetermined loading and thereby enable a change of the angle and an automatic transfer of the effective crank arm from the crank arm pin to the pivot means. Preferably, the resilient means provides a predetermined tension loading that tends to maintain the included angle between the connector and the advance-crank arm, the resilient means enabling a decrease in the included angle when such tension loading is overcome by sufficient pedal force.

BRIEF DESCRIPTION OF THE DRAWINGS

FIG. 1 is a side elevational view of a bicycle incorporating the improved drive assembly;

FIG. 2 is a plan view, partly in cross-section, as seen on line 2—2 of FIG. 1;

FIG. 3 is a side elevational view of the drive assembly;

FIG. 4 is a top plan view of the drive assembly shown in FIG. 3;

FIG. 5 is an enlarged, cross-sectional view as seen on line 5—5 of FIG. 3;

FIG. 6 is a fragmentary, cross-sectional view as seen on line 6—6 of FIG. 5;

FIG. 7 is a schematic diagram of the drive assembly under light pedal pressure;

FIG. 8 is a schematic diagram of the drive assembly under moderate pedal pressure;

FIG. 9 is a schematic diagram of the drive assembly under heavy pedal pressure, and FIG. 10 is a fragmentary, cross-sectional view of the spring connection.

DESCRIPTION OF THE PREFERRED EMBODIMENT:

Referring now by characters of reference to the drawing, and first to FIG. 1, it is seen that the bicycle includes a substantially conventional frame including a front fork 10 mounting the front wheel 11, a rear fork 12 mounting the rear wheel 13, the rear fork 12 being attached to the rear upright bar 14 that is connected at its upper portion to the front fork 10 by a cross bar 15 and at its lower portion to the front fork 10 by a diagonal bar 16. Handle bars 17 are mounted to the front fork 10 for turning the front wheel 11. A seat 18 is carried at the top of the rear upright bar 14. For better stroke leverage, the seat 18 includes a back rest 19.

Figures 3, 4, 5, 6, 10:
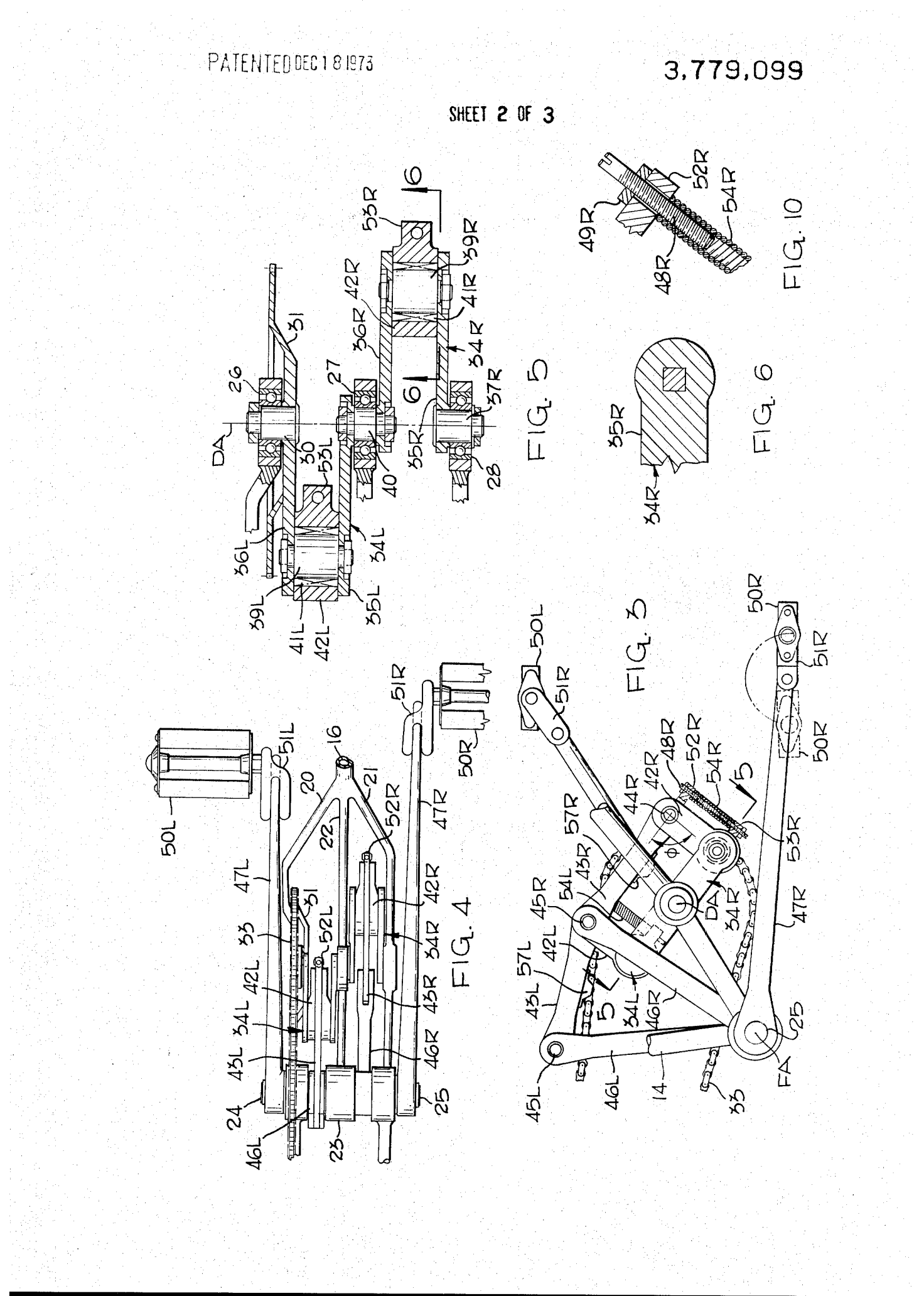

As is best seen in FIG. 4, the diagonal bar 16 at its lower end branches to provide opposed bar portions 20 and 21 and an intervening bar portion 22 interconnected at their lower ends by a bearing journal 23. The lower end of the rear upright bar 14 is also secured to the bearing journal 23 as is shown in FIG. 3. From FIG. 4, it is clear that a pair of stub shafts 24 and 25 are rotatively mounted in opposite ends of the bearing journal 23. The shafts 24 and 25 define a fixed axis FA.

The opposed bar portions 20 and 21 and the intervening bar portion 22 are each provided with a ball bearing 26, 28 and 27 respectively which are transversely aligned in a co-axial drive axis DA. Rotatively mounted by stub shaft 30 in ball bearing 26, is a sprocket 31, constituting a drive member, the sprocket 31 being located inside of the bar portion 20 and being operatively connected to a smaller sprocket 32 on the rear wheel 13 by an endless chain 33 in the conventional manner. It will be understood that rotation of the sprocket 31 acts through the chain 33 to rotate the sprocket 32 and the attached rear wheel 13.

It will be understood that the mechanism of the drive assembly actuated by the rider's right foot is the same as the mechanism provided for the rider's left foot except that the component parts are appropriately arranged so that when the rider's right foot is in its uppermost position, the left foot is in the lowermost position. Consequently, a detailed description of the mechanism for the rider's right foot will suffice for the other mechanism and the corresponding component parts will be given identical reference numbers except that the mechanism for the rider's right foot will bear the suffix R and the mechanism for the rider's left foot will bear the suffix L.

The right hand mechanism of the drive assembly includes a crank arm 34 R pivotally mounted on the same drive axis DA as the sprocket 31. The crank arm 34 R includes a pair of transversely spaced arm portions 35 R and 36 R, the crank arm portion 35 R being rotatively mounted by stub shaft 37 R in the ball bearing 28, while the crank arm portion 36 R is rotatively mounted by shaft 40 in ball bearing 27. The outer ends of the crank arm portions 35 R and 36 R are operatively connected by a crank arm pin 39 R and an associated one-way clutch 41 R to an advance-crank arm 42 R disposed between the crank arm portions 35 R and 36 R. The one-way clutch 41 R enables rotation of the advance-crank arm 42 R relative to the crank arm 34 R in only one direction, that direction being the same as the rotation of crank arm 34 R about the drive axis DA.

A connector 43 R is connected to the opposite end of the advance-crank arm 42 R by pivot means 44 R. The opposite connector end portion is connected by a pivot means 45 R to the upper end of a lever 46 R, the lower end of the lever 46 being drivingly attached to the shaft 25 in the bearing journal 23. Drivingly attached to the outer end of shaft 25 is a pedal arm 47 R that is angularly related to the lever 46 R and extends forwardly for substantially oscillating movement about the fixed axis FA.

Carried on the outer end of the pedal arm 47 R is a pedal 50 R adapted to receive the rider's right foot for actuating the pedal arm 47 R. The pedal 50 R is carried by a frame 51 R that is pivoted to the outer end of the pedal arm 47 R, the frame 51 R being pivotally movable to an extended position shown in full lines or to a retracted position shown in broken lines in FIG. 3 to selectively change the pedal position and change the length of the torque arm from the fixed axis FA on which the pedal arm 47 R is rotatively mounted, and thereby in effect accomplish a change in driving ratio.

The lever 46 R is reciprocated by the pedal arm 47 R and transmits the pedal force through the connector 43 R to the pivot means 45 R. The layer 46 R constitutes a guide means that constrains the connector end portion that is connected to the lever 46 R by the pivot means 45 R to a predetermined path.

The connector 43 R includes an extended portion 52 R located on the opposite side of the pivot means 44 R from that end portion of the connector 43 R that movable in the predetermined path. The advance-crank arm 42 R includes an extended portion 53 R located on the opposite side of the one-way clutch 41 R from the pivot means 44 R. A spring 54 R, constituting a resilient means, operatively extends between and interconnects the extended portions 52 R and 53 R. This spring 54 R is preferably closed tight under tension. When spring 54 R is located between and attached to the extended portions 52 R and 53 R, it is the same as a rigid link that prevents the included angle $\phi$ between the connector 43 R and advance-crank arm 42 R from increasing beyond a predetermined number of degrees. This spring 54 R provides a predetermined loading between the connector 43 R and the advance-crank arm 42 R which tends to maintain the predetermined, included angle $\phi$ between the connector 43 R and the advance-crank arm 42 R.

Any tendency of the connector 43 R and the advance-crank arm 42 R to rotate relatively about the pivot means 44 R to decrease the included angle $\phi$, will be resisted by the predetermined tension loading of spring 54 R.

The pivot means 44 R of the connector 43 R and the advance-crank 42 R is disposed forwardly in the direction of sprocket rotation relative to the crank arm pin 39 R when the crank arm pin 39 R is located substantially at its top center position. When sufficient pedal force is applied through the connector 43 R so that the tension loading of spring 54 R is overcome to allow extension of the spring 54 R and a decrease in the included angle $\phi$ between the connector 43 R and the advance-crank arm 42 R, all of the pedal pressure is transferred from the crank arm pin 39 R to the advance-crank arm 42 R at the pivot means 44 R, thereby automatically transferring and advancing the location of the effective crank arm from the crank arm pin 39 R to the pivot means 44 R. The spring 54 R continues to expand and the included angle $\phi$ between the connector 43 R and the advance-crank arm 44 R continues to decrease until the tension loading of the spring 54 R is balanced by the pedal force, at which time, all the pedal force is shifted automatically back to the crank arm pin 39 R from the pivot means 44 R.

The connector 43 R normally transmits all pedal force to the crank arm pin 39 R, but at the moment of sufficient pedal force to overcome the predetermined tension loading of spring 54 R, the connector 43 R transfers all pedal force to the pivot means 44 R of the advance-crank arm 42 R, and upon further rotation and at the instant the spring 54 R ceases to expand, the pedal force is automatically transmitted back to the crank arm pin 39 R.

The lever 46 moves the connector end portion attached by pivot means 45 R in a predetermined path located in the direction of sprocket rotation at one side of a line drawn between the drive axis DA and the axis of crank arm pin 39 R when the crank arm pin 39 R is located in its top center position. This movement of the connector 43 enables a more efficient transmission of force from the connector 43 R to the crank arm 34 R at the later portion of the downstroke. Efficient transmission of the turning force by the connector 43 R is achieved at the early portion of the downstroke through the transference of pedal force to the advanced position provided by pivot means 44 R from the crank arm pin 39 R, thereby achieving an effective advanced crank arm.

The spring 54 R can be adjusted in degrees from a weak tension loading to a strong tension loading. An adjustable screw 48 R is threadedly attached to the inside and axially of each spring end, the screws 48 R extending through yet secured to the extended portions 52 R and 53 R by lock nuts 49 R that are threadedly adjustable on the screws 48 R and engageable with the extended portions 52 R and 53 R. Threading the screws 48 R into the spring 54 R reduces the effective length of the spring 54 R and thereby reduces the tension loading of the spring 54 R. The tension loading can be predetermined selectively by this adjustment of screws 48 R.

The operation of the drive assembly is perhaps best shown by the diagrammatic illustrations of FIGS. 7–9 under various operating conditions. FIG. 7 shows the operation under light pedal pressure. FIG. 8 shows the operation under moderate pedal pressure. FIG. 9 shows the operation under heavy pedal pressure.

FIG. 7 shows the arrangement of the components parts of the drive assembly in top center in diagram A. It will be noted that the drive axis DA, crank arm pin 39 R and pivot means 45 R are substantially aligned when the crank arm pin 39 R is in the top center position at 0°. In this position, the pedal arm 47 R is located in its raised limit. The tension spring 54 R with its predetermined loading maintains the included angle $\phi$ between the connector 43 R and the advance-crank arm 42 R. When light pedal pressure is applied to the pedal arm 47 R, as for example when the bicycle is traveling down-grade, such pedal pressure will usually not be sufficient to overcome the tension loading of spring 54 R. Under these circumstances, the pedal pressure will be applied by connector 43 R to the crank arm pin 39 R, to rotate the crank arm 34 R and the sprocket 31.

Diagram B of FIG. 7 shows the position of the component parts of the drive assembly at 120° past top center under these circumstances. It will be noted that the spring 54 R has maintained its length and the included angle $\phi$ between the connector 43 R and the advance-crank arm 42 R has been maintained constant. The one-way clutch 41 R has permitted counterclockwise rotation of the advance-crank arm 42 R relative to the crank arm 34 R, while the turning force applied by the connector 43 R to the crank arm pin 39 R has turned the crank arm 34 R. In this instance, the pedal arm 47 R has moved downwardly from its raised limit in diagram A to substantially near its lower limit.

Diagram C of FIG. 7 shows the lower limit of pedal arm 47 R, with the crank arm 34 R located at 240° past top center. Again, the turning force is applied by the connector 43 R to the crank arm pin 39 R, the advance-crank arm 42 R continuing to rotate relatively counterclockwise to the crank arm 34 R. The predetermined tension loading of spring 54 R maintains the included angle $\phi$ between the connector 43 R and the advance-crank arm 42 R.

As long as the pedal pressure does not overcome the tension loading of the spring 54 R, the included angle $\phi$ will be maintained and the component parts will move in the manner described with the turning force applied by the connector 43 R to the crank arm pin 39 R, causing rotation of the crank arm 34 R.

FIG. 8 illustrates the operation of the drive assembly when moderate pedal pressure is applied, as for example, for propelling the bicycle on level or slightly upgrade. Diagram D of FIG. 8 illustrates the location of the crank arm 34 R at 20° past top center when sufficient force is applied to the pedal arm 47 R to overcome the tension loading of spring 54 R. The pedal arm 47 R has moved downwardly a slight distance from its upper limit to the position shown in diagram D. It will be understood that the pedal force transmitted by the connector 43 R has overcome the tension loading of spring 54 R, causing the spring 54 R to extend, thereby decreasing the included angle $\phi$ and causing an immediate and automatic transfer of all pedal force from the crank arm pin 39 R to the pivot means 44 R between the connector 43 R and the advance-crank arm 42 R. Under these conditions, the one-way clutch 41 R locks and precludes rotation of the advance-crank arm 42 R relative to the crank arm 34 R about the crank arm pin 39 R. The pivot means 44 R is located forwardly of the crank arm pin 39 R in the direction of sprocket rotation. Accordingly, the effective crank arm has been advanced automatically several degrees from pin 39 R to pivot means 44 R which allows more efficient application of the torque to the sprocket 31 by the pedal force. When the crank arm 34 R is located at 20° past top center, and under these conditions, the effective crank arm as determined by the position of pivot means 44 R is located at approximately 60° past top center.

The spring 54 R will continue to expand until it balances the pedal force applied through the connector 43 R to the pivot means 44 R. At the instant the spring 54 R ceases to expand, the pedal force applied to the pivot means 44 R will be automatically and immediately transferred back to the crank arm pin 39 R, and hence the effective crank arm is shifted back from pivot means 44 R to pin 39 R.

Diagram E of FIG. 8 illustrates the position of the component parts of the drive assembly after transference of the effective crank arm back to the crank arm pin 39 R, yet the spring 54 R is still slightly extended. The pedal arm 47 R has moved downwardly a further distance and the crank arm 34 R has been rotated by the pedal force applied through the connector 43 R to the crank arm pin 39 R. The spring 54 R continues to contract and the included angle $\phi$ between the connector 43 R and the advance-crank arm 43 R continues to increase. When the pedal force is such that it fails to overcome the predetermined loading of the spring 54 R, the spring 54 R will assume its initial position as illustrated in diagram F of FIG. 8, at which time the included angle $\phi$ is again maintained at its initial predetermined number of degrees. Upon further downward pedal forces applied to the pedal arm 47 R, the pedal force is applied through the connector 43 R to the effective crank arm determined by crank arm pin 39 R.

From diagrams D, E and F of FIG. 8, it is seen that during the early degrees of crank travel, the pedal arm 47 R accelerates in its downward movement because of the expansion of spring 54 R and the transference of pedal force automatically from the crank arm pin 39 R to the pivot means 44 R. During the middle or latter portion of the crank travel, the pedal arm 47 R will decelerate because of the contraction of the spring 54 R and the transference of pedal force back to the crank arm pin 39 R from the pivot means 44 R.

FIG. 9 shows the position of the component parts of the drive assembly under the application of heavy pedal pressure, as for example when the bicycle is traveling up a steep grade. Upon initial application of a high pedal force to the pedal arm 47 R, it will again be apparent that the pedal force overcomes the predetermined tension loading of spring 54 R and causes the spring 54 R to expand, and enable a decrease in the included angle $\phi$ between the connector 43 R and the advance-crank arm 42 R.

From a comparison of diagram E of FIG. 8 and diagram G of FIG. 9, it will be understood that under the heavier pedal force, the spring 54 R is extended further and the included angle $\phi$ is decreased further. Again, under these conditions, the one-way clutch 41 R locks and precludes rotation of the advance-crank arm 42 R relative to the crank arm 34 R about the crank arm pin 39 R.

Again, immediately upon application of sufficient pedal force to overcome the predetermined tension loading of spring 54 R, the pedal force transmitted by connector 43 R is transferred automatically and immediately from the crank arm pin 39 R to the pivot means 44 R, thereby advancing the effective crank arm several degrees. For example, in diagram G of FIG. 9, under these operating conditions, when the crank arm 34 R is located at 45° past top center, the pivot means 44 R, and hence the effective crank arm, is located at just under 90° past top center.

When the tension loading of spring 54 R balances the pedal force, the pedal force transmitted by the connector 43 R will be automatically and immediately transferred back to the crank arm pin 39 R from the pivot means 44 R, and hence the effective crank arm is shifted back from pivot means 44 R to pin 39 R. Then, the spring 54 R will contract and the included angle $\phi$ is allowed to increase. In diagram H of FIG. 9, it will be seen that the spring 54 R has contracted slightly from its extended length as shown in diagram G, that the included angle $\phi$ has increased, and that the advance-crank arm 43 R has rotated counterclockwise about crank arm pin 39 R relative to the crank arm 34 R as permitted by one-way clutch 41 R.

Diagram I of FIG. 9 illustrates the position of the component parts upon further downward travel of the pedal arm 47 R and rotation of the crank arm 34 R. In this position, when the crank arm 34 R is at 160° past top center, the spring 54 R has assumed its initial position and the included angle $\phi$ has assumed its initial predetermined number of degrees. The pedal force transmitted by the connector 43 R is applied to the effective crank arm determined by crank arm pin 39 R.

With a very weak tension loading, as determined by selective adjustment of screws 48 R into the spring 54 R and the locking of the screws 48 R in such position by the nuts 49 R, pedal pressure at top center would be immediately transferred to the advance-crank arm pivot means 44 R and so remain until the pedal pressure was normally released at or near the bottom of the pedal stroke. With such a weak tension load setting, the angle φ closure between the advance-crank arm 42 R and connector 43 R is limited by a stop 57 R on the connector 43 R which abuts the crank arm pivot head.

I claim as my invention:

1. A drive assembly for a physically-propelled vehicle, comprising:
   a. a drive rotatively mounted on a drive axis,
   b. a crank arm mounted for rotation about the drive axis and operatively connected to the drive member for rotating the drive member,
   c. an advance-crank arm,
   d. a connector pivotally connected to the advance-crank arm,
   e. pedal means operatively connected to the connector for moving the connector with an alternating motion of less than 360° in a predetermined path, and
   f. means, during application of pedal force, for automatically shifting the pedal force from the crank arm to the advance-crank arm, and for later reversing this action during the rotation of the crank arm and advance-crank arm about the drive axis.

2. A drive assembly for a physically-propelled vehicle, comprising:
   a. a drive member rotatively mounted on a drive axis,
   b. a crank arm operatively connected to the drive member for rotating the drive member,
   c. a crank arm pin carried by the crank arm,
   d. an advance-crank arm,
   e. clutch means associated with the crank arm pin connecting the advance-crank arm to the crank arm for relative pivotal movement in only one direction,
   f. a connector,
   g. pivot means pivotally connecting the connector to the advance-crank arm,
   h. pedal means operatively connected to the connector for moving a portion of the connector with an alternating motion of less than 360° in a predetermined path,
   i. resilient means interconnecting the connector and the advance-crank arm, and
   j. the connector transferring the turning force from the crank arm pin to the pivot means upon application of sufficient pedal force to overcome the loading of the resilient means.

3. a drive assembly as defined in claim 2, in which:
   k. the crank arm pin is located in spaced relation to the drive axis,
   l. the pivot means is in spaced relation to the crank arm pin, and
   m. all turning force is transferred from the crank arm pin and transmitted by the connector to the pivot means upon application of sufficient pedal force to overcome the loading of the resilient means and enable a change in the angle between the connector and advance-crank arm.

4. A drive assembly as defined in claim 2, in which:
   k. the pedal means includes:
      1. a pivotally mounted pedal arm
      2. means connecting the said connector to the pedal arm to actuate the connector upon movement of the pedal arm, and
      3. a pedal carried by the pedal arm for actuating the pedal arm.

5. A drive assembly as defined in claim 4, in which:
   l. a pedal frame carries the pedal and is mounted on the pedal arm for selective movement to locations at different distances from the fixed axis to change the torque arm.

6. A drive assembly as defined in claim 3, in which:
   n. the clutch means precludes rotation of the advance-crank arm relative to the crank arm in the same direction as the crank arm rotation about the drive axis.

7. A drive assembly as defined in claim 3, in which:
   n. the pedal means is mounted for substantially alternating motion of less that 360°.

8. A drive assembly as defined in claim 6, in which:
   o. the pedal means moves the said connector portion in the predetermined path that is located offset forwardly in the direction of drive member rotation from a line interconnecting the drive axis and top center of the crank arm pin.

9. A drive assembly as defined in claim 3, in which:
   n. the pivot means is disposed forwardly in the direction of drive member rotation relative to the crank arm pin when the crank arm pin is located substantially at its top center position, whereby the effective crank arm position is automatically advanced from the crank arm pin to the said pivot means when the loading of the resilient means is overcome by the application of sufficient pedal force.

10. A drive assembly as defined in claim 3, in which:
    n. the clutch means precludes relative rotation of the crank arm and advance-crank arm in the same direction as the crank arm rotation about the drive axis,
    o. the pedal is mounted for alternating motion of less than 360°, and
    p. the pivot means is disposed forwardly in the direction of drive member rotation relative to the crank arm pin when the crank arm pin is located substantially at its top center position, whereby the effective crank arm position is automatically advanced from the crank arm pin to the said pivot means when the loading of the resilient means is overcome by the application of sufficient pedal force.

11. A drive assembly as defined in claim 10, in which:
    g. the pedal means includes:
       1. a pedal arm pivotally mounted on a fixed axis for substantially alternating motion of less than 360°,
       2. a pedal carried by the pedal arm for actuating the pedal arm, and
       3. means connecting the connector to the pedal arm for actuating the connector.

12. A drive assembly as defined in claim 3, in which:
    n. the resilient means provides a predetermined loading that maintains the angle between the connector and the advance-crank arm until sufficient pedal force is applied through the connector to overcome the predetermined loading of the resilient means and thereby enable the change of the angle and an automatic transfer of the effective crank arm position from the crank arm pin to the pivot means.

13. A drive assembly as defined in claim 12, in which:

o. the resilient means is under predetermined tension loading that tends to maintain the included angle between the connector and the advance-crank arm.

14. A drive assembly as defined in claim 12, in which:
   o. the connector includes an extended portion located on the opposite side of the pivot means from that portion of the connector movable in the predetermined path,
   p. the advance-crank arm includes an extended portion located on the opposite side of the crank arm pin from the said pivot means, and
   q. the resilient means operatively extends between and interconnects the said extended portions of the connector and advance-crank arm.

15. A drive assembly as defined in claim 14, in which:
   r. the resilient means is a tension spring, and
   s. screws threadedly engage the ends of the spring and connect the spring to the extended portions, the screws being adjustable to predetermine the effective tensional loading of the spring.

16. A drive assembly as defined in claim 14, in which:
   r. the pivot means is disposed forwardly in the direction of drive member rotation relative to the crank arm pin when the crank arm pin is located substantially at its top center position, whereby the effective crank arm is automatically advanced from the crank arm pin to the said pivot means when the loading of the resilient means is overcome by the application of sufficient pedal force.

17. A drive assembly for a physically-propelled vehicle, comprising:
   a. a drive member rotatively mounted on a drive axis,
   b. a crank arm mounted for rotation about the drive axis and operatively connected to the drive member for rotating the drive member,
   c. a crank arm pin carried by the crank arm,
   d. an advance-crank arm,
   e. a one-way clutch associated with the crank arm pin and connecting the advance-crank arm to the crank arm in spaced relation to the drive axis for permitting pivotal movement of the advance-crank arm about the crank arm pin and relative to the crank arm in only one direction,
   f. a connector,
   g. a pivot means between the connector and the advance-crank arm in spaced relation to the crank arm pin,
   h. a lever pivotally mounted on a fixed axis and pivotally connected to the connector for moving a portion of the connector in a predetermined path offset in the direction of drive member rotation from a line interconnecting the drive axis and crank arm pin when the crank arm pin is located in its top center position,
   i. a pedal arm pivotally mounted for substantially alternating motion of less than 360° on the same fixed axis as the lever, the pedal arm being attached to the lever to move the lever upon movement of the pedal arm,
   j. a pedal carried by the pedal arm for actuating the pedal arm,
   k. the connector including an extended portion located on the opposite side of the pivot means from that portion of the connector movable in the predetermined path,
   l. the advance-crank arm including an extended portion located on the opposite side of the crank arm pin from the said pivot means,
   m. a resilient means under a predetermined tension loading extending between and interconnecting the said extended portions of the connector and the advance-crank arm, the resilient means tending to maintain the included angle between the connector and the advance-crank arm, and
   n. the connector transmitting all of the turning force to the pivot means upon application of sufficient force to the pedal to overcome the predetermined tension loading and increase the tension loading of the resilient means and enable a change in the included angle between the connector and the advance-crank arm, all of the turning force being automatically shifted from the crank arm pin to the pivot means, and being automatically shifted back to the crank arm pin during further rotation of the crank arm and advance-crank arm about the drive axis as the loading of the resilient means is substantially balanced by the pedal force.

* * * * *